United States Patent

McNulty

Patent Number: 5,233,468
Date of Patent: Aug. 3, 1993

[54] COMPUTER HOOD

[76] Inventor: Helga C. McNulty, 39 Woodbury Rd., Wheatley Heights, N.Y. 11798-2523

[21] Appl. No.: 892,940

[22] Filed: Jun. 3, 1992

[51] Int. Cl.⁵ .................... G02B 27/00; H04N 5/64
[52] U.S. Cl. .................... 359/601; 359/613; 359/614; 358/255
[58] Field of Search ............... 359/601, 614, 611, 612, 359/613, 609; 358/252, 255; 353/97; D14/239

[56] References Cited

U.S. PATENT DOCUMENTS

| | | | |
|---|---|---|---|
| 4,569,572 | 2/1986 | Kopich | 358/252 X |
| 4,863,242 | 9/1989 | Correa | 358/255 X |
| 5,069,529 | 12/1991 | Takahashi | 358/252 X |
| 5,101,298 | 3/1992 | Lentz et al. | 358/255 X |
| 5,115,345 | 5/1992 | Hobson et al. | 359/601 |
| 5,121,253 | 6/1992 | Waintroob | 359/601 |

FOREIGN PATENT DOCUMENTS

| | | | |
|---|---|---|---|
| 563971 | 6/1957 | Italy | 358/255 |
| 1022727 | 3/1966 | United Kingdom | 358/252 |

Primary Examiner—Bruce Y. Arnold
Assistant Examiner—David R. Parsons
Attorney, Agent, or Firm—Kroll, Michael I.

[57] ABSTRACT

A computer hood is provided for a computer having a monitor that contains a cabinet and video display screen behind a keyboard on a desk located in a building having overhead lighting in a ceiling and/or an uncovered window in a wall. The computer hood consists of a structure for covering the front of the cabinet about the video display screen of the monitor of the computer to reduce glare on the video display screen from the overhead lighting in the ceiling and the uncovered window in the wall of the building. It will improve sharpness of display, relieve eyestrain and improve productivity of a person operating the computer.

3 Claims, 2 Drawing Sheets

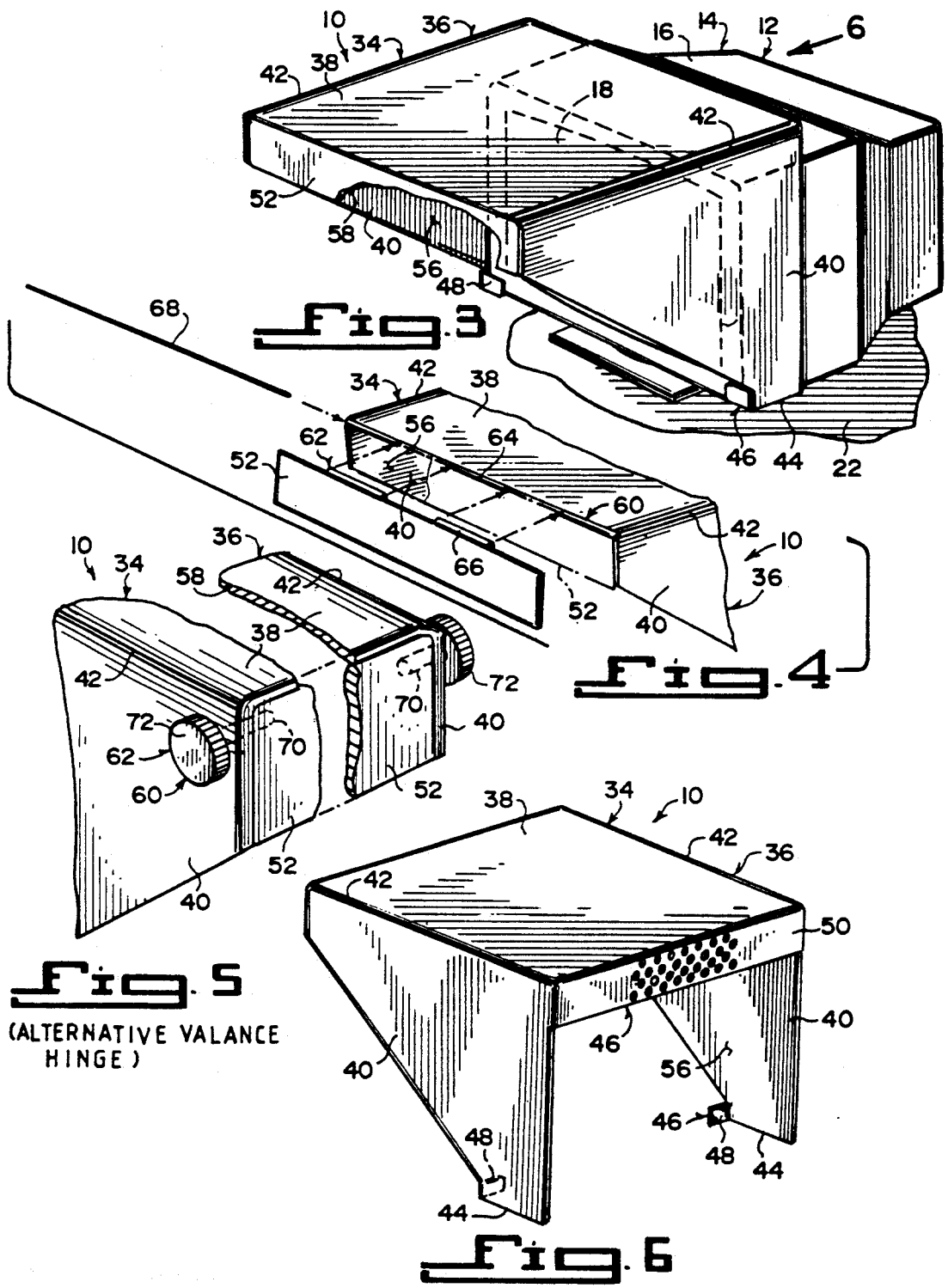

COMPUTER HOOD

BACKGROUND OF THE INVENTION

1. Field of the Invention

The instant invention relates generally to computer accessories and more specifically it relates to a computer hood.

2. Description of the Prior Art

Numerous computer accessories have been provided in prior art that are adapted to be various items which are to be used in conjunction with different types of computers, so as to help aid people using the computers. While these units may be suitable for the particular purpose to which they address, they would not be as suitable for the purposes of the present invention as heretofore described.

SUMMARY OF THE INVENTION

A primary object of the present invention is to provide a computer hood that will overcome the shortcomings of the prior art devices.

Another object is to provide a computer hood that is a three sided enclosure which fits about the front of a monitor to reduce glare on a video display screen from overhead lighting and uncovered windows in a building to relieve eyestrain and improve productivity.

An additional object is to provide a computer hood that can be installed to the monitor by a person without the use and knowledge of special tools, fasteners, skill and instructions.

A further object is to provide a computer hood that is simple and easy to use.

A still further object is to provide a computer hood that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is a front perspective view of a second embodiment installed on the monitor with parts broken away.

FIG. 4 is a front perspective view of a portion of a third embodiment.

FIG. 5 is a front perspective view of a portion of a fourth embodiment.

FIG. 6 is a rear perspective view taken in direction of arrow 6 in FIG. 3 of just the instant invention per se.

DETAILED DESCRIPTION OF THE PREFERRED EMBODIMENTS

Figure 1:
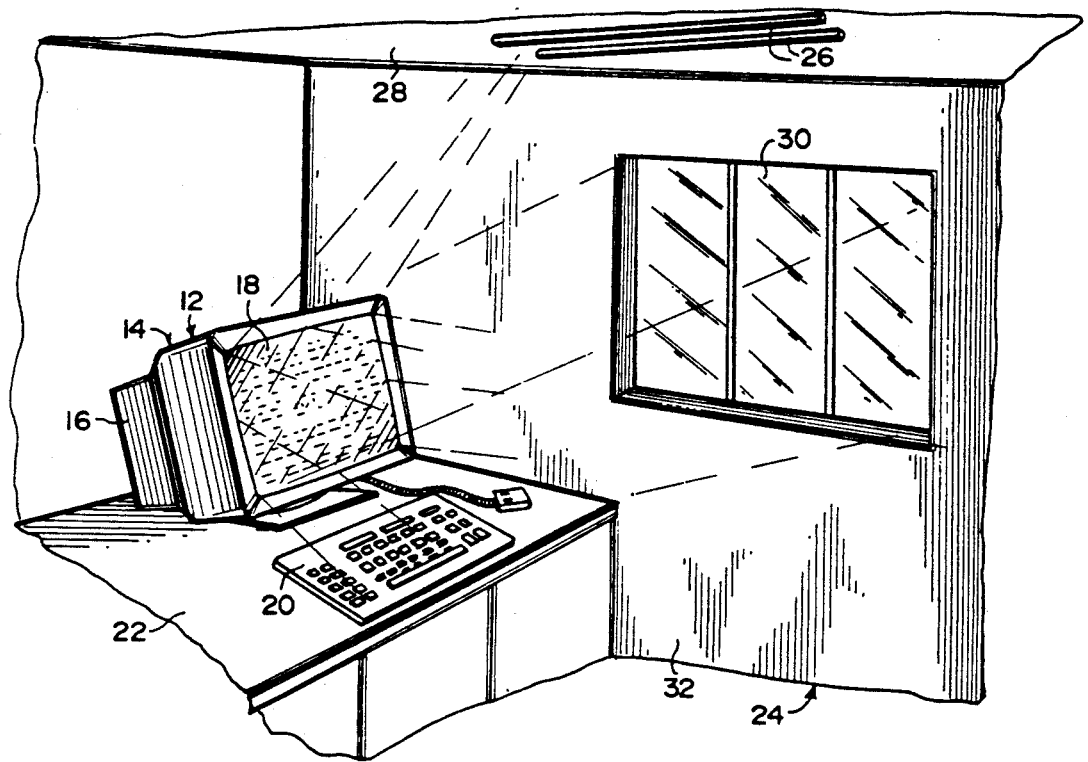
FIG. 1 is a front perspective view of the prior art showing a monitor of a computer placed in a building receiving glare from overhead lighting and an uncovered window.

Turning now descriptively to the drawings, in which similar reference characters denote similar elements throughout the several views, FIG. 1 shows the prior art without the invention, which is a computer hood 10. A computer 12 has a monitor 14 that contains a cabinet 16 and video display screen 18 behind a keyboard 20 on a desk 22 located in a building 24 having overhead lighting 26 in a ceiling 28 and/or an uncovered window 30 in a wall 32. The computer hood 10, as shown in FIGS. 2 through 6, consists of a structure 34 for covering the front of the cabinet 16 about the video display screen 18 of the monitor 14 of the computer 12, to reduce glare on the video display screen 18 from the overhead lighting 26 in the ceiling 28 and the uncovered window 30 in the wall 32 of the building 24. It will improve sharpness of display, relieve eyestrain and improve productivity of a person operating the computer 12.

The covering structure 34 is a three sided enclosure 36, which includes a top wall 38 to extend outwardly from and across the front top portion of the cabinet 16 of the monitor 14 of the computer 12. A pair of side walls 40 extend outwardly from and down the front side portion of the cabinet 16 of the monitor 14 of the computer 12. Each side wall 40 is in a generally triangular configuration with a wide top edge 42 in conjunction with the top wall 38 and a narrow bottom edge 44 below at a bottom front side portion of the cabinet 16 of the monitor 14 of the computer 12.

The computer hood 10 further contains a device 46 for retaining the three sides enclosure 36 to the cabinet 16 of the monitor 14 of the computer 12. The retaining device 46 includes a pair of clips 48, each extending at a right angle at the narrow bottom edge 44 of one of the side walls 40 to hook over a bottom front forward portion of the cabinet 16 of the monitor 14 of the computer 12. A perforated narrow back wall 50 extends across the side walls 40 at the top wall 38 of the three sided enclosure 36 to hook over a top portion of the cabinet 16 of the monitor 14 of the computer 12.

A front valance 52 extends across the side walls 40 at the top wall 38 of the three sided enclosure 36 to help reduce the glare from the overhead lighting 26 in the ceiling 28 of the building 24.

A black colored coating 54 can be applied to the interior surface 56 of the top wall 38 and the side walls 40 of the three sided enclosure 36, to further reduce glare on the video display screen 18 on the monitor 14 of the cabinet 16.

The top wall 30, the side walls 40, the clips 48, the perforated narrow back wall 50 and the front valance 52 are fabricated out of a durable lightweight material 58, typically but not limited to foam core board, cardboard, plastic sheeting and sheet metal.

Figure 2:
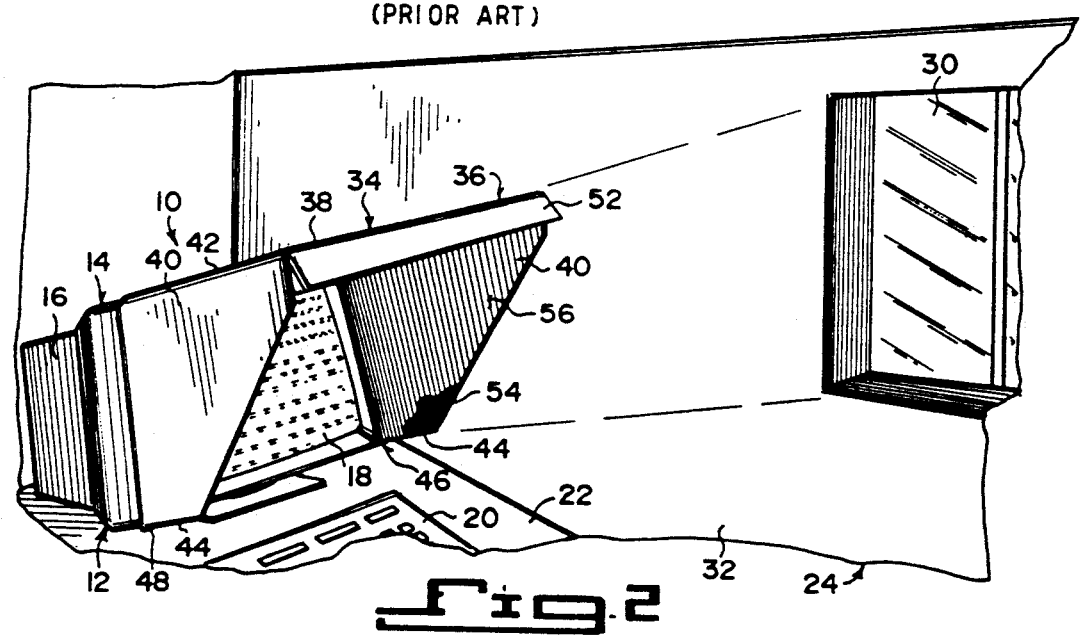
FIG. 2 is a front perspective view of a first embodiment of the instant invention installed on the monitor of the computer to reduce the glare.

In FIG. 2, the front valance 52 is outwardly angularly positioned with respect to the top wall 38 of the three sided enclosure 36. In FIG. 3, the front valance 52 is perpendicularly positioned with respect to the top wall 38 of the three sided enclosure 36. The front valance 52 in FIGS. 4 and 5 includes an apparatus 60 for changing its position with respect to the top wall 38 of the three sided enclosure 36.

The position changing apparatus 60 is a hinge 62 located at an upper edge of the front valance 52 and a forward edge of the top wall 38 of the three sided enclosure 36, so that the front valance 52 can be positioned at different angles thereto.

The hinge 62 in FIG. 4, contains a first set of barrels 64 formed at the forward edge of the top wall 38 of the three sided enclosure 36, in a spaced apart relationship therealong. A second set of barrels 66 are formed at the upper edge of the front valance 52 in a spaced apart relationship, so as to fit between the first set of barrels 64. An elongated pin 68 extends through the first set of barrels 64 and the second set of barrels 66.

The hinge 62 in FIG. 5, consists of a pair of short shafts 70, each extending through one of the side walls 40 of the three sided enclosure 36 at an upper forward corner thereof and into an upper side edge of the front valance 52. A pair of knurled knobs 72 are provided, with each affixed to one of the short shafts 70, so that when the knurled knobs 70 are rotated the front valance 52 will pivot to different angular positions.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A computer hood for a computer having a monitor that contains a cabinet and video display screen behind a keyboard, said computer hood comprising means for covering the front of the cabinet about the video display screen of the monitor of the computer to reduce glare on the video display screen to improve sharpness of display to relieve eyestrain and improve productivity of a person operating the computer, wherein said covering means is a three sided open, roughly U-shaped structure, wherein said three sided open, roughly U-shaped structure includes: a top wall to extend outwardly from and across the front top portion of the cabinet of the monitor of the computer; and a pair of side walls to extend outwardly from and down a front side portion of the cabinet of the monitor of the computer, wherein each of said side walls is in a generally triangular configuration with a wide top edge in conjunction with said top wall and a narrow bottom edge below at a bottom front side portion of the cabinet of the monitor of the computer, said covering means further including means for retaining said three sided open, roughly U-shaped structure to the cabinet of the monitor of the computer, wherein said retaining means includes: a pair of clips, each extending at a right angle at the narrow bottom edge of one of said side walls to hook over a bottom front forward portion of the cabinet of the monitor of the computer; a perforated narrow back wall extending from one side wall to another at said top wall of said three sided open, roughly U-shaped structure to hook over a top portion of the cabinet of the monitor of the computer; and a one piece homogeneous front valance extending from inside one side wall to inside another at said top wall of said three sided open, roughly U-shaped structure to help reduce the glare from the overhead lighting in the ceiling of the building, wherein said one piece homogeneous front valance includes means for changing its position with respect to said top wall of said three sided open, roughly U-shaped structure, wherein said position changing means is a hinge located at an upper edge of said one piece homogeneous front valance and a forward edge of said top wall of said three sided open, roughly U-shaped structure so that said one piece homogeneous front valance can be positioned at different angles from inside said three sided open, roughly U-shaped structure, wherein said hinge includes: a first set of barrels formed at the forward edge of said top wall of said three sided open, roughly U-shaped structure in a spaced apart relationship therealong; and second set of barrels formed at the upper edge of said front valance in a spaced apart relationship, so as to fit between said first set of barrels; and an elongated pin to extend through said first set of barrels and said second set of barrels, wherein said hinge further includes a pair of short shafts, each extending through one of said side walls of said three sided open, roughly U-shaped structure at an upper forward corner thereof and into an upper side edge of said one piece homogeneous front valance; and a pair of knurled knobs, each affixed to one of said short shafts, so that when said knurled knobs are rotated said one piece homogeneous valance will pivot to different angular positions.

2. A computer hood as recited in claim 1, further including a black colored coating applied to the interior surface of said top wall and said side walls of said three sided open, roughly U-shaped structure to further reduce glare on the video display screen on the monitor of the cabinet.

3. A computer hood as recited in claim 1, wherein said top wall, said side walls, said clips, said perforated narrow back wall and said front valance are fabricated out of a durable lightweight material.

* * * * *